US005633458A

United States Patent [19]

[11] Patent Number: 5,633,458

[45] Date of Patent: May 27, 1997

Pauli et al.

[54] ON-BOARD FUEL DELIVERY DIAGNOSTIC SYSTEM FOR AN INTERNAL COMBUSTION ENGINE

[75] Inventors: Allen J. Pauli, Macomb Township; Patrick J. Shelly, Framington; Mark D. Leroux, Allen Park; Thomas R. Melville, Northville, all of Mich.

[73] Assignee: Ford Motor Company, Dearborn, Mich.

[21] Appl. No.: 586,115

[22] Filed: Jan. 16, 1996

[51] Int. Cl.$^{6}$ .................................................. G01M 15/00

[52] U.S. Cl. .................................. 73/119 A; 364/431.053

[58] Field of Search .......................... 73/115, 116, 117.2, 73/117.3, 118.1, 119 A, 40.5 R, 49.7, 756, 114; 364/431.05

[56] References Cited

U.S. PATENT DOCUMENTS

| | | | |
|---|---|---|---|
| 3,919,885 | 11/1975 | Kaireit | 73/119 A |
| 4,109,518 | 8/1978 | Dooley | 73/119 A |
| 4,261,209 | 4/1981 | Hatsuno et al. | 73/119 A |
| 4,333,338 | 6/1982 | Patey et al. | 73/119 A |
| 4,362,052 | 12/1982 | Heath et al. | 73/119 A |
| 4,391,133 | 7/1983 | Ito | 73/119 A |
| 4,404,847 | 9/1983 | Larson | 73/119 A |
| 4,428,228 | 1/1984 | Banzhaf et al. | 73/119 A |
| 4,437,341 | 3/1984 | Ito et al. | 73/119 A |
| 4,453,403 | 6/1984 | Bussey et al. | 73/119 A |
| 4,499,876 | 2/1985 | Yamamoto | 123/446 |
| 4,523,572 | 6/1985 | Staerzl | 73/114 |
| 4,696,275 | 9/1987 | Kushi et al. | 123/478 |
| 4,788,858 | 12/1988 | Liebermann | 73/119 A |
| 4,791,808 | 12/1988 | Lackner et al. | 73/117.3 |
| 4,791,810 | 12/1988 | Old et al. | 73/119 A |
| 4,798,084 | 1/1989 | Takahashi et al. | 73/119 A |
| 4,879,985 | 11/1989 | Day et al. | 73/119 A |
| 4,899,713 | 2/1990 | Nakamura | 123/478 |
| 4,930,482 | 6/1990 | Kako | 123/478 |
| 4,932,246 | 6/1990 | Deutsch et al. | 73/119 A |
| 4,977,872 | 12/1990 | Hartopp | 73/119 A |
| 5,056,026 | 10/1991 | Mitchell et al. | 73/119 A |
| 5,107,701 | 4/1992 | Smith | 73/119 A |
| 5,211,150 | 5/1993 | Anzai | 123/480 |
| 5,357,792 | 10/1994 | Getenby | 73/119 A |
| 5,369,991 | 12/1994 | Armstrong | 73/119 A |
| 5,386,721 | 2/1995 | Alvizar | 73/118.1 |
| 5,445,019 | 8/1995 | Glidewell et al. | 73/119 A |

*Primary Examiner*—Richard Chilcot
*Assistant Examiner*—George M. Dombroske
*Attorney, Agent, or Firm*—Neil P. Ferraro

[57] ABSTRACT

An on-board diagnostic system for performing a diagnostic test on a fuel delivery system. The diagnostic system is controlled by a controller such as a powertrain control module or an electronic engine controller. With the engine off and key on, fuel is delivered to the engine's fuel rail. A standard, production pressure sensor in fluid communication with the fuel rail records the pressure in the fuel delivery system. The recorded pressure is then compared to a stored acceptable pressure range to determine whether the fuel delivery control means is delivering fuel to the fuel rail and whether the fuel delivery system is holding pressure. Each fuel injector is then actuated for a specified time. When the injector is actuated, the fuel pressure drop sensed by the pressure sensor is compared to a stored pressure drop range to determine whether the injector is faulty. The test can only be performed a limited number of times before the engine must be turned on to burn off excess fuel to prevent both catalyst damage and hydrostatic lockup of the engine.

19 Claims, 4 Drawing Sheets

ON-BOARD FUEL DELIVERY DIAGNOSTIC SYSTEM FOR AN INTERNAL COMBUSTION ENGINE

FIELD OF THE INVENTION

The present invention relates to a diagnostic system for detecting faults in the fuel delivery system of an internal combustion engine, and more particularly, to a system that utilizes an on-board controller to perform a diagnostic test on the fuel delivery system.

BACKGROUND OF THE INVENTION

Currently, time consuming, labor intensive procedures are used to detect, faulty fuel systems of internal combustion engines. These procedures require external testing equipment to be attached to the engine. Although U.S. Pat. No. 5,455,019 discloses an on-board diagnostic system for detecting impaired fuel injectors of a fuel delivery system thereby obviating the need for external testing equipment, problems exist with the system disclosed in the '019 patent. As used herein, "on-board" means that the instructions or program necessary to perform the test is encoded within a computer that controls the engine, typically referred to as a powertrain control module (PCM) or an electronic engine controller (EEC). Generally, the system disclosed in U.S. Pat. No. 5,455,019 initiates a test whereby each fuel injector is actuated and the pressure in the fuel rail near the fuel injector is monitored. This pressure is then compared to a pressure range stored within the memory of the PCM. If the monitored pressure is within the specified range, then the injector is functioning properly. If not, the faulty injector is repaired or replaced accordingly.

In U.S. Pat. No. 5,455,019, the system performs the diagnostic test while the engine is running and uses a high cost pressure transducer. This results in undesirable pressure pulses because of the overlap of the pressure waves from one injection event to the next while the engine is running. A software algorithm is used to separate the pulses by intruding on normal engine running strategy and momentarily shutting off the fuel to the injectors.

SUMMARY OF THE INVENTION

An object of the invention claimed herein is to provide a system to detect a faulty fuel delivery system of an automotive internal combustion engine. The system uses an on-board controller to actuate the fuel delivery system, whereby fuel system pressure is monitored while the engine is off using a low cost, production pressure sensor. The monitored pressure is compared to stored pressure data to detect whether a fuel delivery control means and the fuel injectors are operational and whether the system has any leaks.

The above objective is achieved and problems of prior approaches overcome by a diagnostic system that performs a diagnostic test on a fuel delivery system of an internal combustion engine while the engine is off. The fuel delivery system includes a plurality of fuel injectors in fluid communication with the engine for supplying fuel to the engine; a fuel rail in fluid communication with the injectors; a fuel delivery control means to selectively deliver fuel to the fuel rail; and a pressure sensor in fluid communication with said fuel rail for sensing pressure in said fuel delivery system during normal operation of the engine, as well as during said diagnostic test. The diagnostic system includes a controller means for performing the diagnostic test. The controller means causes a fuel delivery actuation means to actuate the fuel delivery control means and causes a fuel injector actuation means to actuate at least one injector for a predetermined time period. The controller means then compares a fuel pressure in the fuel delivery system sensed by the pressure sensor during that time period to an acceptable fuel pressure drop range stored in a storage means. The controller means signals the results of the test including which of the injectors causes the fuel pressure in the fuel delivery system sensed during that time period to be outside the acceptable fuel pressure drop range.

To prevent both catalyst damage and hydrostatic lockup of the engine, the controller means prohibits a further test from occurring before requiring the engine to be started if a predetermined number of tests have been performed. The controller means of the diagnostic system also compares a fuel pressure in the fuel delivery system sensed prior to actuation of any of the fuel injectors to a stored acceptable pressure range to determine whether the fuel delivery control means is delivering fuel to the fuel rail and whether the fuel system is holding pressure.

The above objective is also achieved and problems of prior approaches also overcome by an article of manufacture for performing a diagnostic test on a fuel delivery system. The article of manufacture includes a computer storage medium having a computer program encoded therein for causing a computer to perform a diagnostic test on the fuel delivery system of an automotive internal combustion engine while the engine is off. The fuel delivery system has at least one fuel injector in fluid communication with the engine for supplying fuel to the engine, a fuel rail in fluid communication with the fuel injector and the engine, a fuel delivery control means to selectively deliver fuel to the fuel rail, and a pressure sensor in fluid communication with said fuel rail for sensing pressure in said fuel delivery system during normal operation of the engine, as well as during said diagnostic test. The computer storage medium includes a computer readable program code means for causing the computer to actuate the fuel delivery control means to deliver fuel to the fuel rail; to actuate at least one of the injectors for a predetermined time period; to compare a fuel pressure in the fuel delivery system sensed by the pressure sensor during that time period to a stored acceptable fuel pressure drop range; and, to signal the results of the test including which of the injectors, upon actuation thereof, causes the fuel pressure in the fuel delivery system sensed during that time period to be outside the acceptable fuel pressure drop range. In order to prevent both catalyst damage and hydrostatic lockup of the engine, the computer storage medium also includes a computer readable program code means for causing the computer to prohibit a further test from occurring before requiring the engine to be started if a predetermined number of tests has been performed.

The above objective is also achieved and problems of prior approaches also overcome by a method for performing a diagnostic test on a fuel delivery system of an automotive internal combustion engine while the engine is off. The method uses an on-board controller means having an operator input means for performing the diagnostic test. The fuel delivery system includes at least one fuel injector in fluid communication the engine for supplying fuel to the engine, a fuel rail in fluid communication with the fuel injector and the engine, a fuel delivery control means to selectively deliver fuel to the fuel rail, and a pressure sensor in fluid communication with said fuel rail for sensing pressure in said fuel delivery system during normal operation of the engine, as well as during said diagnostic test. The method includes the steps of delivering fuel to the fuel rail; actuating at least one of the injectors for a predetermined time period; comparing a fuel pressure in the fuel delivery system sensed by the pressure sensor during that time period to a stand acceptable fuel pressure drop range; and, providing a signal as to the results of the test including which of the injectors, upon actuation thereof, causes the fuel pressure in the fuel delivery system sensed during that time period to be outside the acceptable fuel pressure drop range. The method also includes the step of prohibiting a further test from occurring before requiring the engine to be started if a predetermined number of tests has been performed to prevent both catalyst damage and hydrostatic lockup of the engine.

An advantage of the present invention is that a standard, low cost, production pressure sensor already in place in the fuel system and used for normal operation of the system may be used to record pressure in the fuel delivery system.

Another advantage of the invention is that the system performs the diagnostic test while the engine is off thereby allowing isolation of each component of the fuel delivery system during testing.

Still another advantage is that warranty costs may decrease as a result of detecting faulty components of the fuel delivery system without the need for disassembly.

Yet another advantage is that no expensive external diagnostic equipment is needed to perform the diagnostic test.

Other objects, features and advantages of the present invention will be readily appreciated as the same becomes better understood by the reader of this specification.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 1:
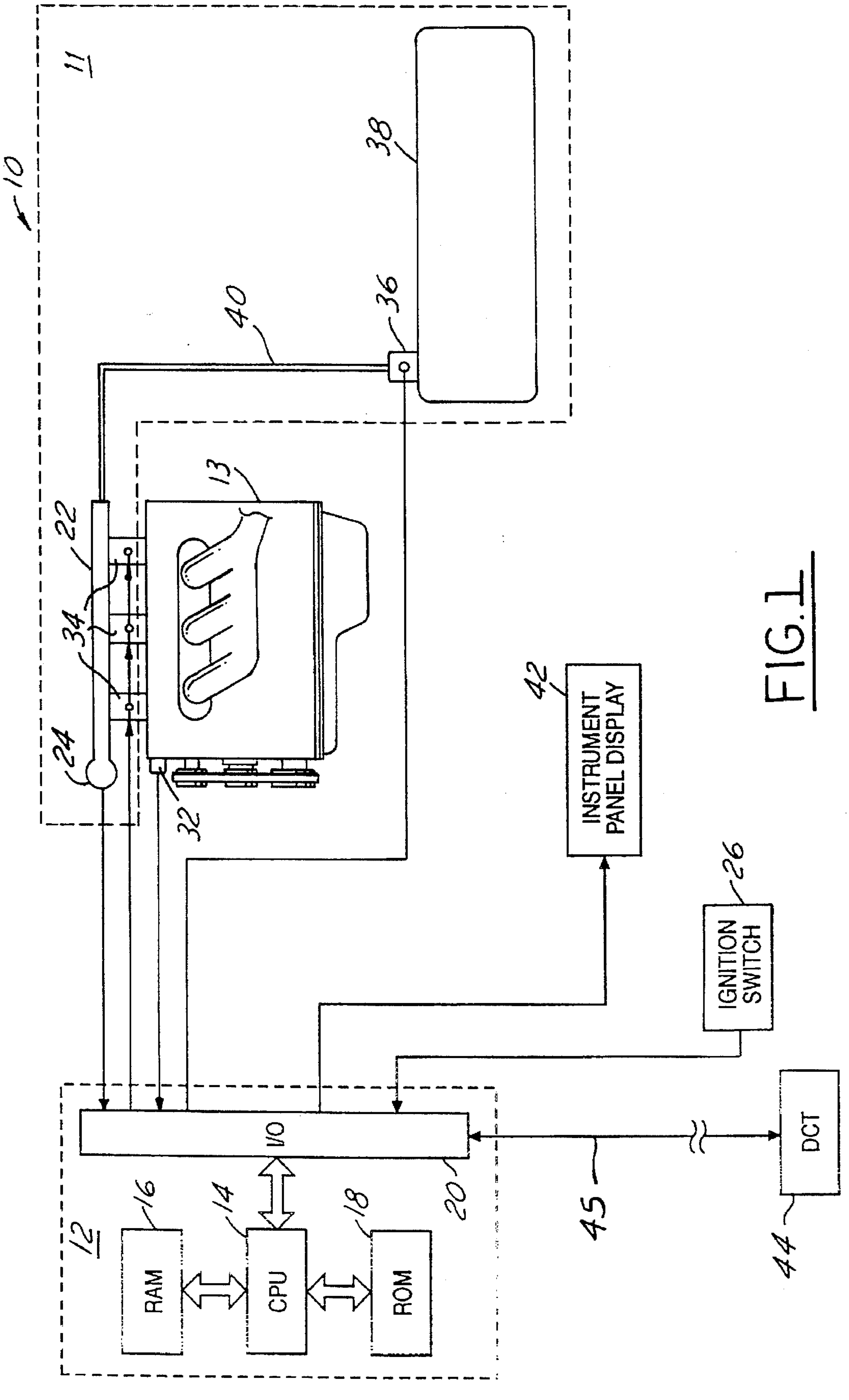
FIG. 1 is a schematic representation of the diagnostic system according to the present invention.

Diagnostic system 10 according to the present invention has an on-board controller (computer) 12, such as an EEC or PCM, for performing a fuel delivery diagnostic test on fuel delivery system 11 of an automotive internal combustion engine 13 as shown in FIG. 1. Controller 12 has CPU 14, random access memory (RAM) 16, computer storage medium (ROM) 18 having a computer readable code encoded therein, which is an electronically programmable chip in this example, and input/output (I/O) bus 20. The computer program encoded in computer storage medium 18 causes controller 12 to perform the diagnostic test. Thus, according to the present invention, the test is performed using an on-board controller. No external diagnostic equipment is necessary. Controller 12 performs the diagnostic test by receiving various inputs through I/O bus 20 such as fuel pressure in fuel delivery system 11, as sensed by pressure sensor 24 (because pressure sensor 24, in this example, is connected to fuel rail 22); the position of ignition switch 26; and, temperature of engine 13 as sensed by temperature sensor 32. Controller 12 also sends various outputs through I/O bus 20 to actuate the various components of the fuel delivery system 11. Such components include fuel injectors 34, which are in fluid communication with fuel rail 22 to inject fuel into the cylinders (not shown) of engine 13 and fuel delivery control means 36 to selectively deliver fuel from fuel source 38 to fuel rail 22 via fuel line 40. It should be noted that the fuel may be liquid fuel, in which case fuel delivery means 36 is an electronic fuel pump. Alternatively, according to the present invention, the fuel may be gaseous fuel, in which case fuel delivery control means 36 is a solenoid valve and fuel rail 22 is a fuel supply manifold. Controller 12 then signals the results of the test to, for example, instrument panel display 42.

Figure 2A:
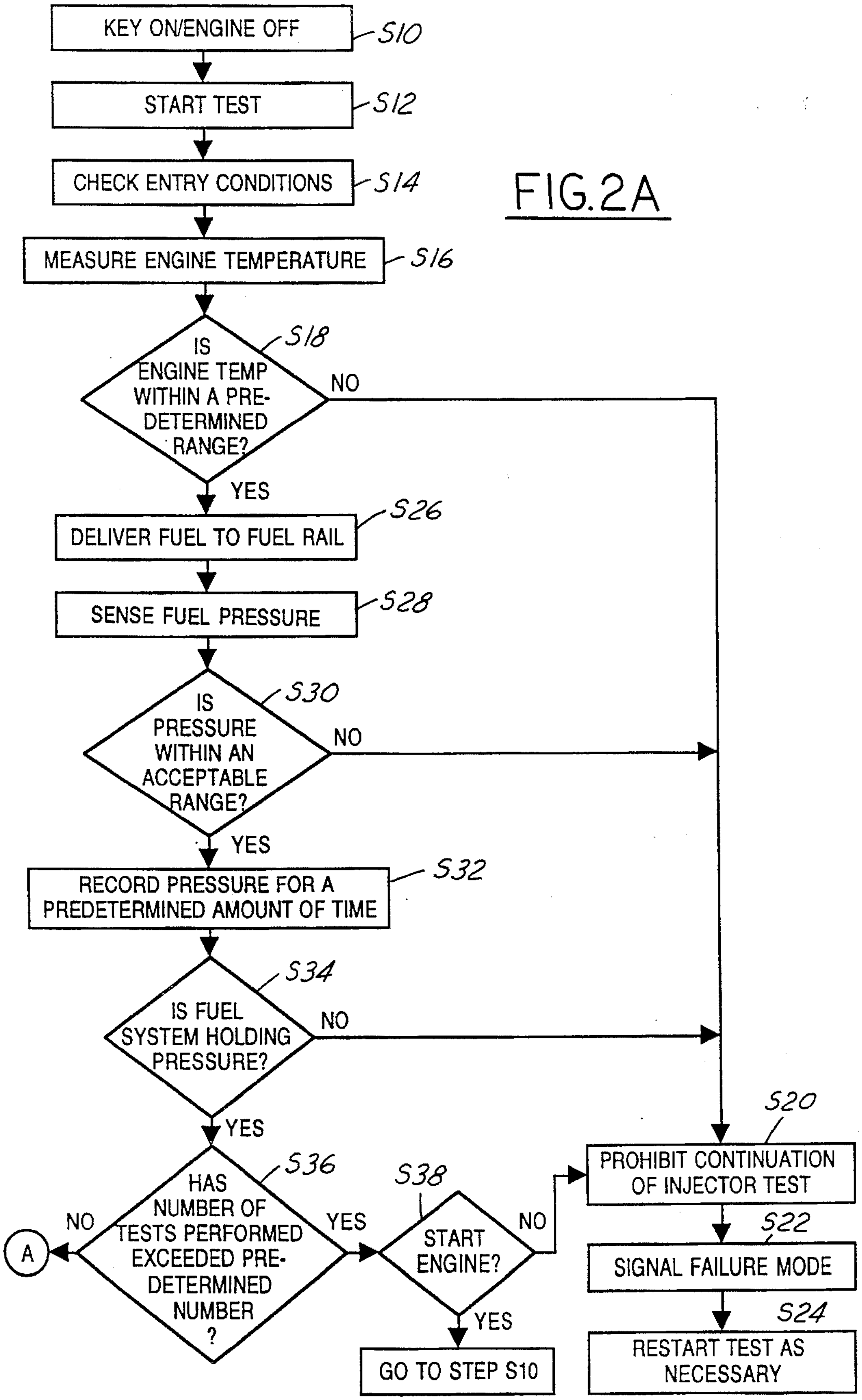
FIGS. 2*a* and 2*b* are flowcharts showing the operation of the diagnostic system according to the present invention; and, FIG. 3 is a graph showing an example of the monitored pressure of the fuel delivery system according to the present invention.
Figure 2B:
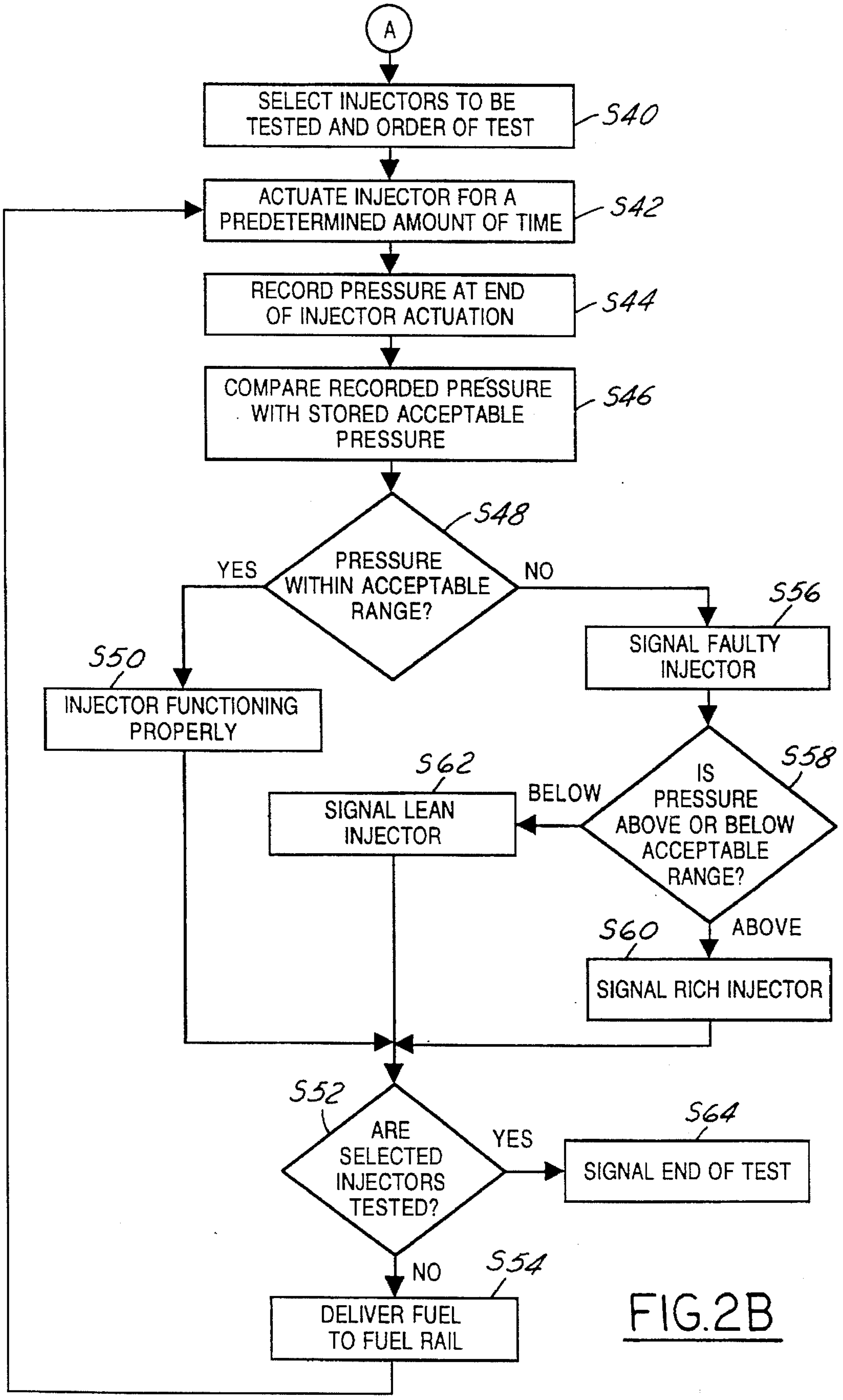

According to the present invention, in response to a fault signal such as "check engine" displayed on instrument panel display 42 or in response to driveability complaints, an operator, such as a service bay technician, initiates the diagnostic test, as shown with particular reference to FIGS. 2*a* and 2*b*. FIG. 2*b* is a continuation of FIG. 2*a* and thus the flow chart depicted therein will be described with reference to FIG. 2 hereinafter. Ignition switch 26 is placed in the "on" position but engine 13 is not cranked over and thus remains off as shown at step S10 of FIG. 2 as "key-on/engine-off". Thus, power is delivered to fuel diagnostic system 10 while engine 13 is off. At step S12, the diagnostic test begins. That is, the operator either directly activates controller 12 or, in a preferred embodiment, uses diagnostic communicator tool 44 (see FIG. 1) to activate controller 12. Diagnostic communicator tool 44, also referred to as a scan tool, is a hand-held device used to communicate with controller 12. The operator simply attaches tool 44 to I/O bus 20, through diagnostic communicator link 45, to communicate therewith. Further, tool 44 is capable of receiving signals, as desired, from controller 12 to inform the operator as to the results of the diagnostic test as will be described hereinafter.

Alternatively, as would be apparent to one of ordinary skill in the art in view of this disclosure, controller 12 may perform a self-diagnostic test according to a predetermined test schedule. That is, controller 12 may be programmed so as to perform the diagnostic test, for example, every certain number of vehicle miles, engine hours or even on a calendar schedule without request from an operator. When the test is scheduled to be performed, the test may commence the next time that the engine is turned off. However, according to the present invention, a time delay exists when ignition switch 26 is in the "key off/engine off" position such that power to diagnostic system 10 remains on for the duration of the diagnostic test. The results of the test are then stored in storage medium 18 to provide a history as to the performance of fuel system 11 over time or to allow an operator to access the stored data as desired.

At step S14, controller 12 checks the entry conditions. To continue the test, certain entry conditions must be satisfied. For example, the temperature of engine 13 must be within a certain range and, after a predetermined number of tests are performed, engine 13 must be started. Thus, at step S16, controller 12 receives a signal from temperature sensor 32. At step S18, this temperature signal is compared acceptable temperature range data stored in memory 18. In a preferred embodiment, the range is from about 0° F. to about 200° F. If the temperature is outside this range, then at step S20, continuation of the diagnostic test is prohibited. At step S22, controller 12 signals, for example, either diagnostic communicator tool 44 or instrument panel display 42 the result that the test, will not be performed because the temperature of engine 13 is outside the desired range. At step S24, the test is restarted as necessary. If the temperature is within the desired range, then, at step S26 controller 12 signals fuel delivery control means 36 to deliver fuel to fuel rail 22 through fuel line 40.

At step S28, controller 12 receives a signal from pressure sensor 24. According to the present invention, pressure sensor 24 is a production pressure sensor, one that is already embodied in fuel rail 22 during production of the automotive engine. That is, no special external pressure sensor need be connected to fuel rail 22 to perform the diagnostic test. Further, according to the present invention, pressure sensor 24 need not be highly sensitive because the pressure is recorded while engine 13 is off. However, as will be apparent to one of ordinary skill in the art in view of this disclosure, diagnostic system 10 must be calibrated for each particular fuel delivery system 11 and engine 13. That is, because engine 13 is not running, diagnostic system 10 is calibrated to optimize the test results without regard to normal engine operating conditions. As will become apparent, appropriate time delays, such as the time required to monitor pressure in fuel delivery system 11 prior to actuation of injectors 34, can be incorporated or calibrated into diagnostic system 10 to account for the characteristics of the pressure sensor 24 selected during engine production and to allow for dampening of the pressure pulses. This will allow for simple isolation of the components of fuel delivery system 11 without interfering with normal engine strategy. Further, appropriate pressure ranges are calibrated and stored in memory 18 according to the particular components of fuel delivery system 11 used in a particular production engine.

Figure 3:
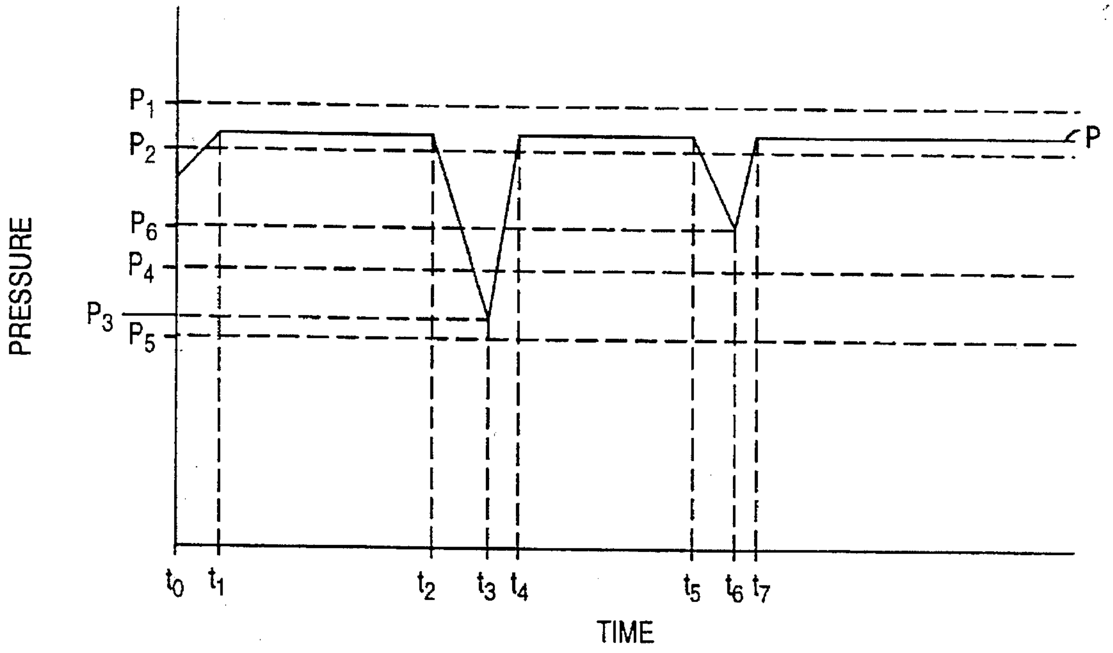

Continuing with reference to FIG. 2, at step S30, controller 12 determines whether pressure in fuel delivery system 11, as sensed by pressure sensor 24, is within the calibrated pressure range as stored in memory 18. If not, then, at step S20, continuation of the diagnostic test is prohibited due to a faulty fuel delivery control means 36. At step S22, controller 12 signals, for example, either diagnostic communicator tool 44 or instrument panel display 42 as to this test result. That is, as shown in FIG. 3, which represents a hypothetical graphical representation of the fuel pressure P as recorded by pressure sensor 24 during a test, if the pressure at $t_1$ is not between $P_1$ and $P_2$, a fault exists meaning that fuel delivery control means 36 has delivered fuel at too high or too low of a pressure. If no fault exists, at step S32, controller 12 records the pressure in fuel delivery system 11 for a predetermined amount of time as shown in FIG. 3 as the time between $t_1$ and $t_2$. Controller 12 then determines, at step S34, whether there has been a pressure drop. If pressure in fuel delivery system 11 drops below a predetermined level (shown as $P_2$ in FIG. 3) during that time period, then, at step S20, continuation of the diagnostic test is prohibited. At step S22, controller 12 signals, for example, either diagnostic communicator tool 44 or instrument panel display 42 that a pressure leak exists in fuel delivery system 11.

Further, continuing with FIG. 2, at step S36, controller 12 checks the next entry condition by determining whether the number of diagnostic tests already performed exceeds a predetermined number calibrated for a particular engine and stored in memory 18. That is, if a certain number of tests have already been performed, the continuation of the diagnostic test will be prohibited. The reason for this is to allow excess fuel build-up in the cylinders of engine 13 to be purged, or burned, by starting engine 13 so as to prevent both catalyst damage and hydrostatic lockup of engine 13. The excess fuel is a result of actuation of fuel injectors 34 in prior tests while engine 13 is off. Thus, if at step S36 this particular test exceeds the predetermined number, then at step S38, controller 12 requires that engine 13 be started to continue with the test. Once engine 13 is started through ignition switch 26, for example, or if the particular test has not exceeded the predetermined number of tests, the test then proceeds to step S40. Preferably, the predetermined number of tests is in the range from about 2 to about 5, and, desirably, 3.

Next, fuel injector testing begins. In particular, at step S40, the order of injector actuation is selected. Thus, injectors 34 need not be tested in the firing order but may be tested in any sequence desired. In addition, not all injectors 34 need be tested. Proceeding to step S42, controller 12 actuates selected injectors 34 for a predetermined amount of time, which is shown as the time between $t_2$ and $t_3$ in FIG. 3. At step S44, pressure $P_3$ in fuel delivery system 11 is recorded by pressure sensor 24 at the end of injector actuation at $t_3$ of FIG. 3. Proceeding then to step S46, controller 12 compares this recorded pressure $P_3$ with acceptable pressure range data stored in memory 18. At step S48, controller 12 determines whether the pressure recorded during step S44 is within acceptable range and shown as the pressure between $P_4$ and $P_5$ in FIG. 3. If the pressure is within the range, then at step S50, controller 12 determines that injector 34 is functionally properly. Controller 12 then determines, at step S52, whether all selected fuel injectors 34 have been tested. If there are additional fuel injectors 34 to be tested, then, at step S54, controller 12 actuates fuel delivery control means 36 to deliver fuel to fuel rail 22. This is shown as an increase in fuel pressure during the time between $t_3$ and $t_4$ in FIG. 3. The test then proceeds to step S42 where the next selected injector 34 is actuated for a predetermined amount of time shown as the time period between $t_5$ and $t_6$ in FIG. 3.

At step S48, if the pressure (shown as $P_6$ in FIG. 3) measured in fuel delivery system 11 is outside the acceptable range stored in memory 18, then at S56, a faulty injector signal test result is sent to, for example, either instrument panel display 42 or diagnostic communicator tool 44. Controller 12 can also detect whether a particular cylinder is running rich or lean. Thus, at step S58, controller 12 determines whether the pressure recorded by pressure sensor 24 in fuel delivery system 11 is below the acceptable range or above acceptable range. In the example shown in FIG. 3, the pressure ($P_6$) for the next selected fuel injector 34 is above the acceptable pressure drop range (shown as the pressure between $P_3$ and $P_4$). If the pressure measured by pressure sensor 24 in fuel delivery system 11 is above the acceptable range (above $P_4$), then, at step S60, controller 12 signals, for example, either instrument panel display 42 or diagnostic communicator tool 44 that the tested injector is running lean. On the other hand, at step S58, if the pressure measured by pressure sensor 24 is below the acceptable range (below $P_5$), then, at step S62, controller 12 signals instrument panel 42 or diagnostic communicator tool 44 that the tested injector is running rich. That is, because the pressure drop is lower than the acceptable range, then the injector is delivering too much fuel to engine 13. In either case, the test proceeds to step S52 to determine whether all selected injector have been tested. If all injectors 34 have been tested, then, at step S64, controller 12 signals instrument panel display 42 or diagnostic communicator tool 44 of the completion of the fuel delivery system diagnostic test.

While the best mode in carrying out the invention has been described in detail, those having ordinary skill in the art to which this invention relates will recognize various alternative designs and embodiments, including those mentioned above, in practicing the invention that has been defined by the following claims.

We claim:

1. A diagnostic system for performing a diagnostic test on a fuel delivery system of an internal combustion engine while the engine is off, the fuel delivery system comprising: a plurality of fuel injectors in fluid communication with the engine for supplying fuel to the engine; a fuel rail in fluid communication with said injectors; a fuel delivery control means to selectively deliver fuel to said fuel rail; and, a pressure sensor in fluid communication with said fuel rail for sensing pressure in said fuel delivery system during normal operation of the engine, as well as during said diagnostic test, the diagnostic system comprising:

- a controller means for performing said diagnostic test comprising:
  - a fuel delivery actuation means for actuating said fuel delivery control means;
  - a fuel injector actuation means for actuating at least one said injector for a predetermined time period;
  - a storage means for storing an acceptable fuel pressure drop range;
  - a comparison means for comparing a fuel pressure in said fuel delivery system sensed by said pressure sensor during said time period to said stored acceptable fuel pressure drop range;
  - a signaling means for signaling the results of said test comprising which of said injectors, upon actuation thereof, causes said fuel pressure in said fuel delivery system sensed during said time period to be outside said acceptable fuel pressure drop range; and,
  - a test prohibiting means for prohibiting a further test from occurring before requiring the engine to be started if a predetermined number of tests have been performed.

2. A diagnostic system according to claim 1 wherein said predetermined number of tests is in the range from about 2 to about 5.

3. A diagnostic system according to claim 2 wherein said predetermined number of tests is 3.

4. A diagnostic system according to claim 1 wherein said controller means further comprises an operator input means for performing said diagnostic test upon activation from an operator.

5. A diagnostic system according to claim 4 wherein a diagnostic communicator tool is used to activate said controller means through said operator input means to perform said diagnostic test.

6. A diagnostic system according to claim 5 wherein said diagnostic communicator tool receives said signal from said signaling means as to the results of said test.

7. A diagnostic system according to claim 4 wherein said controller means actuates said injectors in an order selected by the operator.

8. A diagnostic system according to claim 1 wherein said controller means actuates said injectors in a predetermined order.

9. A diagnostic system according to claim 1 wherein said test prohibiting means prohibits said test from occurring unless engine temperature is within a specified range.

10. A diagnostic system according to claim 9 wherein said temperature range is between about 0° F. to about 200° F.

11. A diagnostic system according to claim 1 wherein said controller means compares a fuel pressure in said fuel delivery system sensed prior to actuation of any of said fuel injectors to a stored acceptable pressure range to determine whether said fuel delivery control means is defective and whether said fuel delivery system has any pressure leaks.

12. A diagnostic system according to claim 1 wherein said fuel delivery control means is an electronic fuel pump to supply liquid fuel to said fuel rail.

13. A diagnostic system according to claim 1 wherein said fuel delivery control means is a solenoid valve to supply gaseous fuel to said fuel rail.

14. An article of manufacture comprising:

- a computer storage medium having a computer program encoded therein for causing a computer to perform a diagnostic test on a fuel delivery system of an automotive internal combustion engine while the engine is off, the fuel delivery system having at least one fuel injector in fluid communication with the engine for supplying fuel to the engine, a fuel rail in fluid communication with the fuel injector and the engine, a fuel delivery control means to selectively deliver fuel to the fuel rail, and a pressure sensor in fluid communication with the fuel rail for sensing fuel pressure in the fuel delivery system during normal operation of the engine, as well as during said diagnostic test, said computer storage medium comprising:
- a computer readable program code means for causing said computer to actuate the fuel delivery control means to deliver fuel to the fuel rail;
- a computer readable program code means for causing said computer to actuate at least one of the injectors for a predetermined time period;
- a computer readable program code means for causing said computer to compare a fuel pressure in the fuel delivery system sensed by the pressure sensor during said time period to a stored acceptable fuel pressure drop range;
- a computer readable program code means for causing said computer to signal the results of said test comprising which of the injectors, upon actuation thereof, causes said fuel pressure in the fuel delivery system sensed during said time period to be outside said acceptable fuel pressure drop range; and,
- a computer readable program code means for causing said computer to prohibit a further test from occurring before requiring the engine to be started if a predetermined number of tests has been performed.

15. An article of manufacture according to claim 14 further comprising a computer readable program code means for causing said computer to compare a fuel pressure in the fuel delivery system sensed prior to actuation of any of said fuel injectors to a stored acceptable pressure range to determine whether said fuel delivery control means is defective and whether said fuel delivery system has any pressure leaks.

16. An article of manufacture according to claim 14 wherein said computer storage medium comprises an electronically programmable chip.

17. A method for performing a diagnostic test on a fuel delivery system of an automotive internal combustion engine while the engine is off using an on-board controller means having an operator input means for performing said diagnostic test, the fuel delivery system comprising at least one fuel injector in fluid communication the engine for supplying fuel to the engine, a fuel rail in fluid communication with the fuel injector and the engine, a fuel delivery control means to selectively deliver fuel to the fuel rail, and a pressure sensor in fluid communication with the fuel rail for sensing fuel pressure in the fuel delivery system during normal operation of the engine, as well as during said diagnostic test, said method comprising the steps of:

delivering fuel to the fuel rail;

actuating at least one of the injectors for a predetermined time period;

comparing a fuel pressure in the fuel delivery system sensed by the pressure sensor during said time period to a stored acceptable fuel pressure drop range;

providing a signal as to the results of said test including which of the injectors, upon actuation thereof, causes said fuel pressure in the fuel delivery system sensed during said time period to be outside said acceptable fuel pressure drop range; and, prohibiting a further test from occurring before requiring the engine to be started if a predetermined number of tests has been performed.

18. A method according to claim 17 further comprising the steps of:

activating said on-board controller means using a diagnostic communicator tool; and, signaling said diagnostic communicator tool as to the results of said test.

19. A method according to claim 17 further comprising the step of comparing a fuel pressure in said fuel delivery system sensed prior to actuation of any of said fuel injectors to a stored acceptable pressure range to determine whether said fidel delivery control means is defective and whether said fuel delivery system has any pressure leaks.

* * * * *